United States Patent
Fonollosa et al.

(10) Patent No.: US 8,974,598 B2
(45) Date of Patent: Mar. 10, 2015

(54) HIGH OR ULTRA-HIGH PERFORMANCE CONCRETE

(75) Inventors: Philippe Fonollosa, Montigny le Bretonneux (FR); Jean-Francois Batoz, Paris (FR); Jeffrey Chen, Lyons (FR)

(73) Assignee: Lafarge, Paris (FR)

( * ) Notice: Subject to any disclaimer, the term of this patent is extended or adjusted under 35 U.S.C. 154(b) by 121 days.

(21) Appl. No.: 13/258,731

(22) PCT Filed: Mar. 23, 2010

(86) PCT No.: PCT/FR2010/000242
§ 371 (c)(1),
(2), (4) Date: Oct. 27, 2011

(87) PCT Pub. No.: WO2010/109095
PCT Pub. Date: Sep. 30, 2010

(65) Prior Publication Data
US 2012/0037045 A1     Feb. 16, 2012

(30) Foreign Application Priority Data
Mar. 25, 2009 (FR) ..................................... 0901396

(51) Int. Cl.
*C04B 7/00* (2006.01)
*C04B 14/00* (2006.01)
(Continued)

(52) U.S. Cl.
CPC .............. *C04B 28/04* (2013.01); *C04B 40/0042* (2013.01)
USPC ............ 106/816; 106/757; 106/784; 106/636

(58) Field of Classification Search
CPC ........ C04B 28/02; C04B 7/527; C04B 2/008; C04B 2/0088; C04B 33/025; C04B 2235/54
USPC .................................. 106/816, 636, 757, 784
See application file for complete search history.

(56) References Cited

U.S. PATENT DOCUMENTS

2007/0266906 A1 * 11/2007 Garcia .......................... 106/817

FOREIGN PATENT DOCUMENTS

| EP | 0 744 387 B1 | 3/1999 |
| EP | 1 958 926 | 8/2008 |

(Continued)

OTHER PUBLICATIONS

"Concrete Basics". Portland Cement Association. Dec. 30, 2006 [Retrieved on Apr. 17, 2014] Retrieved from http://web.archive.org/web/20061230211619/http://www.cement.org/basics/concretebasics_faqs.asp.*

(Continued)

*Primary Examiner* — Kaj K Olsen
*Assistant Examiner* — Karam Hijji
(74) *Attorney, Agent, or Firm* — Pillsbury Winthrop Shaw Pittman LLP (57) ABSTRACT

A binder premix includes from 0.2% to 63% of a material of an ultrafine particle size category, including individual particles with a D90 value less than 1 μm and/or with a BET specific surface greater than 5 $m^2/g$; from 8% to 63% of selected Portland cement including particles with a D90 value less than 30 μm and from 25% to 85% of a material, other than the cement, of a fine particle size category, including particles for which the D10 and D90 values are from 1 μm to 120 μm and with a BET specific surface less than 5 $m^2/g$. A binder mix including, in addition to the premix, a material of a medium particle size category, including particles for which the D10 and D90 values are from 120 μm to 5 mm is disclosed.

15 Claims, 2 Drawing Sheets

(51) Int. Cl.
*C04B 2/10* (2006.01)
*C04B 7/52* (2006.01)
*C04B 9/04* (2006.01)
*C04B 11/00* (2006.01)
*C04B 28/14* (2006.01)
*C04B 28/26* (2006.01)
*C04B 28/04* (2006.01)
*C04B 40/00* (2006.01)

(56) References Cited

FOREIGN PATENT DOCUMENTS

| FR | 2 866 330 | 8/2005 |
|----|-----------|--------|
| FR | 2 921 358 | 3/2009 |
| WO | WO 2007026352 A2 * | 3/2007 |

OTHER PUBLICATIONS

International Search Report for PCT/FR2010/000242.
Rougeau, Patrick et al.; "Ultra High Performance Concrete with Ultrafine Particles other than Silica Fume, Proceedings of the International Symposium on Ultra High Performance Concrete", Sep. 13, 2004, vol. 3, pp. 213-225.
Long, Guangeheng et al.; "Very-High Performance Concrete with Ultrafine Powders", Cement and Concrete Research, 2002, vol. 32, pp. 601-605.
Fu, Jinsheng et al.; "An Experimental Study of the Impact Breakage of Wet Granules", Cement Engineering, Science, 2005, vol. 60, pp. 4005-4018.

* cited by examiner

Fig. 2

HIGH OR ULTRA-HIGH PERFORMANCE CONCRETE

CROSS-REFERENCE TO RELATED APPLICATIONS

This is the U.S. National Stage of PCT/FR2010/000242, filed Mar. 23, 2010, which in turn claims priority to French Patent Application No. 0901396, filed Mar. 25, 2009, the entire contents of all applications are incorporated herein by reference in their entireties.

The invention relates to a high or ultra-high performance concrete and with a low content of Portland cement, as well as to processes for the preparation of such a concrete and to premixes and mixes useful in the preparation of such a concrete.

Technological developments in recent years in the field of concretes have resulted in the development of innovative cement formulations which make it possible to obtain ultra-high performance concretes in terms, in particular of compressive strength. These formulations generally involve recourse to supplementary materials, in addition to the cement and aggregates, which are, for example, fibres, organic admixtures or "ultrafine" particles, generally smaller in size than the cement grains. Furthermore, the formulations of conventional high or ultra-high performance concretes have a relatively high cement content.

In point of fact, the processes for the manufacture of cement and more particularly of its essential constituent, clinker, are responsible for high emissions of carbon dioxide. This is because the production of clinker grains implies:
a) the preheating and the decarbonation of the raw meal which is obtained by grinding the raw materials, which are in particular limestone and clay; and
b) the burning or clinkering of the meal at a temperature of approximately 1500° C., followed by sudden cooling.

These two stages produce $CO_2$, on the one hand as direct product of the decarbonation and, on the other hand, as a byproduct of the combustion which is carried out in the burning stage in order to raise the temperature.

In point of fact, high emissions of carbon dioxide in conventional processes for the production of cement and concrete compositions constitute a major environmental problem and, in the current context, are subject of high economic penalties.

There therefore exists a strong need for a process capable of producing high or ultra-high performance concrete with reduced associated emissions of carbon dioxide.

With this aim, the present invention provides a binder premix comprising, in mass proportions:
  from 0.2% to 63% of a material of an ultrafine particle size category, comprising individual particles with a D90 value less than 1 µm and/or with a BET specific surface greater than 5 m²/g;
  from 8% to 63% of selected Portland cement comprising particles with a D90 value less than 30 µm; and
  from 25% to 85% of a material, other than the cement, of a fine particle size category, comprising particles for which the D10 and D90 values are from 1 µm to 120 µm and with a BET specific surface less than 5 m²/g.

The present invention also provides a binder mix, comprising the premix defined above and a material of a medium particle size category, comprising particles for which the D10 and D90 values are from 120 µm to 5 mm.

Another subject matter of the present invention is a concrete composition, comprising a binder mix as defined above, mixed with water.

Another subject matter of the invention is a process for the preparation of a concrete according to the invention comprising a stage of mixing the binder mix according to the invention with water.

The aim of the invention is to provide at least one of the determining advantages described below.

Advantageously, the composition according to the invention has a high mechanical strength, greater than or equal to 50 MPa in the short term, in particular after 48 hours.

The invention makes it possible to respond to the need to reduce $CO_2$ emissions until now not satisfied by high or ultra-high performance concretes. This is because the amount of cement (and in particular of clinker) used in the context of the present invention is lower than that which is conventionally needed for high and ultra-high performance concretes.

The concrete obtained according to the invention also attempts to provide at least one of the following advantages:
  its behaviour with regard to the corrosion of the reinforcements of reinforced concrete is at least as good as that of a conventional high or ultra-high performance concrete;
  its porosity and its permeability are at least of the same order, indeed even lower, than those of a conventional high or ultra-high performance concrete; and
  its resistance to the diffusion of chlorides is at least of the same order as that of a conventional high or ultra-high performance concrete.

The invention has the advantage of being able to be used in several industries, in particular the building industry, the chemical industry (admixture producers), all the construction markets (building, civil engineering or pre-cast plant), the construction industry of units or the cement industry.

Other advantages and characteristics of the invention will become clearly apparent on reading the following description and examples, given purely by way of illustration and without implied limitation.

The expression "hydraulic binder" is understood to mean, according to the present invention, a pulverulent material which, mixed with water, forms a paste which sets and hardens by a series of hydration reactions and processes and which, after hardening, retains its strength and its stability even under water.

The term "concrete" is understood to mean a mix of hydraulic binders, of aggregates, of water, optionally of additives and optionally of mineral additions, such as, for example, high performance concrete, ultra-high performance concrete, self-placing concrete, self-leveling concrete, self-compacting concrete, fibre-reinforced concrete, ready-mix concrete or coloured concrete. The term "concrete" is also understood to mean concretes which have been subjected to a finishing operation, such as bush-hammered concrete, deactivated or washed concrete, or polished concrete. This definition is also understood to mean prestressed concrete. The term "concrete" comprises mortars: in this precise case, the concrete comprises a mix of hydraulic binder, of sand, of water and optionally of additives. The term "concrete" according to the invention denotes without distinction fresh concrete or hardened concrete.

The expression "high performance concrete" is understood to mean a concrete having a compressive strength at 28 days of from 50 MPa to 100 MPa. The expression "ultra-high performance concrete" is understood to mean a concrete having a compressive strength at 28 days greater than 100 MPa and generally greater than 120 MPa.

According to the invention, the term "aggregates" denotes, for example, fine gravel and/or sand.

According to the invention, the expression "mineral additions" denotes a finely divided mineral material used in the concrete in order to improve certain properties or to confer specific properties on it. They are, for example, fly ash (as defined in the standard EN 450), slags (as defined in the standard NF P 18-506), limestone additions (as defined in the standard NF P 18-508) and siliceous additions (as defined in the standard NF P 18-509).

The expression "Portland cement" is understood to mean, for example, according to the invention, a cement of CEM I, CEM II, CEM III, CEM IV or CEM V type according to the "Ciment" [Cement] Standard NF EN 197-1.

The expression "selected Portland cement" is understood to mean, for example, according to the invention, a Portland cement on which a preparation operation is carried out in order to retain particles of a given particle size category, for example a more exhaustive grinding than that generally carried out in order to obtain a conventional Portland cement, a selection or a classification, for example by sieving or by pneumatic selection.

In the continuation of the description, unless otherwise indicated, the proportions indicated by percentages correspond to mass proportions.

The present invention provides a binder premix comprising, in mass proportions:
  from 0.2% to 63% of a material of an ultrafine particle size category, comprising individual particles with a D90 value less than 1 µm and/or with a BET specific surface greater than 5 m²/g;
  from 8% to 63% of selected Portland cement comprising particles with a D90 value less than 30 µm; and
  from 25% to 85% of a material, other than the cement, of a fine particle size category, comprising particles for which the D10 and D90 values are from 1 µm to 120 µm and with a BET specific surface less than 5 m²/g.

Preferably, the premix is intended for the preparation of an ultra-high performance concrete.

Preferably, the binder premix comprises, in mass proportions:
  from 14% to 45% of the material of the ultrafine particle size category;
  from 15% to 50% of selected Portland cement; and
  from 25% to 60% of the material of the fine particle size category.

The present invention also provides a binder mix comprising the premix defined above and a material of a medium particle size category, comprising particles for which the D10 and D90 values are from 120 µm to 5 mm.

Advantageously, the binder mix comprises, in mass proportions:
  from 0.2% to 25% of the material of the ultrafine particle size category;
  from 8% to 25% of the selected Portland cement;
  from 25% to 40% of the material of the fine particle size category; and
  from 20% to 60% of the material of the medium particle size category.

Advantageously, the mix comprises, in mass proportions:
  from 10% to 20% of the material of the ultrafine particle size category;
  from 10% to 20% of the selected Portland cement;
  from 25% to 33% of the material of the fine particle size category; and
  from 35% to 55% of the material of the medium particle size category.

According to an example of an embodiment, the binder mix additionally comprises a material of a higher particle size category, comprising particles for which the D10 value is greater than 5 mm.

According to an example of an embodiment, the mix comprises, in mass proportions:
  from 0.2% to 20% of the material of the ultrafine particle size category;
  from 8% to 20% of the selected Portland cement;
  from 25% to 32% of the material of the fine particle size category;
  from 20% to 48% of the material of the medium particle size category; and
  from 20% to 60% of the material of the higher particle size category.

The materials composing the above mix are present in the form of particles, that is to say of unitary elements of materials. The distribution of the size of the particles makes it possible to establish a division of the constituents into several "particle size categories", that is to say into substantially disconnected compartments.

Thus, the ultrafine particle size category comprises:
(i) particles with a D90 value less than 1 µm; or
(ii) particles with a BET specific surface greater than 5 m²/g; or
(iii) particles with a D90 value less than 1 µm and with a BET specific surface greater than 5 m²/g.

The fine particle size category corresponds to an assembly of particles having D10 and D90 values of from 1 µm to 120 µm and having a BET specific surface less than 5 m²/g. The medium particle size category corresponds to an assembly of particles having D10 and D90 values of from 120 µm to 5 mm. And the higher particle size category corresponds to an assembly of particles having a D10 value greater than 5 mm.

The D90 value, also denoted $D_v90$ value, corresponds to the 90th centile of the distribution in size by volume of the particles, that is to say that 90% of the particles have a size smaller than the D90 value and 10% have a size bigger than the D90 value. Likewise, the D10 value, also denoted D10 value, corresponds to the 10th centile of the distribution in size by volume of the particles, that is to say that 10% of the particles have a size smaller than the D10 value and 90% have a size bigger than the D10 value.

In other words: at least 80% of the particles of the fine particle size category (preferably at least 90%, particularly preferably at least 95%, even at least 99%) have a size of from 1 µm to 120 µm; at least 80% of the particles of the medium particle size category (preferably at least 90%, particularly preferably at least 95%, even at least 99%) have a size of from 120 µm to 5 mm; at least 90% of the particles of the higher particle size category (preferably at least 95%, even at least 99%) have a size greater than 5 mm; and, according to the embodiments corresponding to the cases (i) and (iii) above, at least 90% of the particles of the ultrafine particle size category (preferably at least 95%, particularly preferably at least 99%) have a size less than 1 µm. The four particle size categories (ultrafine, fine, medium and higher) then correspond to substantially disconnected size compartments.

The D10 or the D90 value of an assembly of particles can generally be determined by laser particle sizing for the particles with a size less than 63 μm or by sieving for the particles with a size greater than 63 μm.

The BET specific surface is a measurement of the total surface area of the particles, which takes into account the presence of protrusions, irregularities, surface or internal cavities, or porosity.

According to an alternative embodiment, there may be overlap between the sizes of the particles of the fine and ultrafine categories, that is to say that more than 10% of the particles respectively of the ultrafine and fine categories may lie within the same size range.

An example of a case where the ultrafine and fine categories differ only in the BET specific surface and not in the size of the particles may be that where the ultrafines are composed of ground materials from hydrated hydraulic binder. In this example, the ultrafines can have a size of the order of 10 μm, for a specific surface which can be of the order of 100 m$^2$/g (due to the porosity of this material).

According to an embodiment, the assembly composed of the cement and the fine particle size category comprises particles having D10 and D90 values of from 1 to 20 μm. In other words, according to this embodiment, at least 80% of the particles of cement or of the material of the fine particle size category (preferably at least 90%, very particularly preferably at least 95%, even at least 99%) have a size of from 1 to 20 μm. This embodiment corresponds to the case where the particle size distribution profile comprises an interruption: the mixture substantially does not comprise particles of diameter from 20 to 120 μm.

The various embodiments described above correspond to optimized forms of packing grains or particles. The invention also provides, as described above, the binder premixes which correspond to these mixes for dry mortars and which do not contain material of the medium particle size category or material of the higher particle size category. Said binder premixes are intended to be mixed with materials of the medium and higher particle size categories before or during the preparation of the concrete.

In the compositions as defined above, the cement is Portland cement selected from Portland cements of the APC (Artificial Portland Cement) type and in particular from the cements described in the European EN 197-1 Standard. It is possible to use, for example, a CEM I or CEM II 52.5 N or R or PM (marine construction) cement or PMES cement (marine construction, sulphated water). The cement can be of the HES (High Early Strength) type. In some cases, in particular for the CEM II type, the Portland cement is not composed of pure clinker but it is supplied mixed with at least one additional material (for example, slag, pozzolana, fly ash, calcined shale or limestone) in an amount ranging up to 37%. In these cases, the amounts of cement which are described above correspond more particularly to the amounts of clinker, whereas the additional materials are accounted for in the appropriate particle size category.

The higher particle size category can, for example, comprise fine gravel and/or gravel and/or pebbles.

The medium particle size category can, for example, comprise sand, or fine sand.

The fine particle size category can, for example, comprise one or more materials chosen from fly ash, pozzolanas (natural and artificial), limestone powders, siliceous powders, lime, calcium sulfate (in particular gypsum in the anhydrous or hemihydrate form) and slags.

The term "fillers" is sometimes employed to denote the majority of materials of the fine particle size category.

The ultrafine particle size category can, for example, comprise a material chosen from the group consisting of limestone powders, precipitated carbonates, natural and artificial pozzolanas, pumice, ground fly ash, ground materials from carbonated or hydrated silicic hydraulic binder, and mixes or cogrindings thereof, in the dry form. In particular, the material of the ultrafine particle size category does not substantially comprise silica fume. The expression "not substantially" is understood to mean that the amount of silica fume is less than 1% by weight of the total mass of the material of the ultrafine particle size category.

The term "ground materials from hydrated silicic hydraulic binder" denotes in particular the products described in the document FR 2 708 592.

A plasticizer or superplasticizer can advantageously be added to a binder mix or premix according to the invention, preferably at a concentration of 0.05% to 3%, preferably 0.5% to 2%, expressed as a mass ratio of dry extract of the plasticizer to the mass of binder premix. The amount of plasticizer is also determined as a function of the quality desired for the paste, in particular depending on whether or not a self-placing concrete is desired. Spread measurements make it possible to determine the type and the amount of superplasticizer to be used in the formulation.

The term "superplasticizer" is understood to mean, according to the present invention, both water-reducers and superplasticizers, as described in the work entitled "Concrete Admixtures Handbook, Properties, Science and Technology", V. S. Ramachandran, Noyes Publications, 1984.

A water-reducer is defined as an additive which reduces the amount of mixing water for a concrete for a given workability, typically by 10% to 15%. Water-reducers comprise, for example, lignosulfonates, hydroxycarboxylic acids, hydrocarbons and other specialized organic compounds, for example glycerol, polyvinyl alcohol, sodium alumino-methyl-siliconate, sulfanilic acid and casein.

Superplasticizers belong to a novel category of water-reducers which is chemically different from normal water-reducers and capable of reducing the amount of mixing water by 30%. Superplasticizers have generally been categorized into four groups: sulfonated naphthalene formaldehyde condensate (SNF) (generally a sodium salt); sulfonated melamine formaldehyde condensate (SMF); modified lignosulfonates (MLS); and others. New-generation superplasticizers comprise compounds of the dispersant type having a comb structure. These dispersants carry ionic functional groups of the carboxylic and/or sulfonic and/or phosphonic type, preferably carboxylic type, and grafted chains of the following types: polyethylene glycol, polypropylene glycol, copolymer or other chain, preferably water-soluble. The amount of superplasticizer required generally depends on the reactivity of the cement. The lower the reactivity of the cement, the lower the amount of superplasticizer required. In order to reduce the total amount of alkali metals, the superplasticizer can be used in the form of a calcium salt rather than of a sodium salt.

Other known additives or admixtures can also be used in the context of the invention, for example an antifoaming agent (for example polydimethylsiloxane). They can also comprise silicones in the form of a solution, of a solid or preferably in the form of a resin, of an oil or of an emulsion, preferably in water. More particularly adapted silicones comprise the characteristic groups $RSiO_{0.5}$ and $R_2SiO$. In these formulae, the R radicals, which can be identical or different, are preferably hydrogen or an alkyl group of 1 to 8 carbon atoms, the methyl group being preferred. The number of characteristic groups is preferably from 30 to 120.

The mix according to the invention may comprise a thickening agent and/or an agent to modify the flow limit (generally in order to increase the viscosity and/or the flow limit). Such agents comprise: cellulose derivatives, for example water-soluble cellulose ethers, such as sodium carboxymethyl, methyl, ethyl, hydroxyethyl and hydroxypropyl ethers; alginates; and xanthan, carrageenan or guar gum. A mix of these agents can be used.

The mix according to the invention may comprise an activating agent which makes it possible to promote the hydration reactions of vitreous materials. Such agents comprise sodium and/or calcium salts.

The mix according to the invention may comprise an accelerator and/or an air-entraining agent and/or a retarder.

The mix may comprise fibres, for example metal fibres, organic fibres or glass fibres or a combination thereof.

The concrete according to the invention is prepared by mixing the above mixes or the above binder premixes with water. The concrete can also be prepared by directly mixing the various ingredients of the above mixes or above binder premixes with one another and with water, in the following proportions:

from 10 to 550 kg/m$^3$ of the material of the ultrafine particle size category;
from 130 to 450 kg/m$^3$ of selected Portland cement;
from 200 to 800 kg/m$^3$ of the material of the fine particle size category;
from 500 to 1300 kg/m$^3$ of the material of the medium particle size category; and
from 150 to 300 l/m$^3$ of water.

The term "kg/m$^3$" is understood to mean the mass of materials to be used per m$^3$ of produced fresh concrete.

The materials in question have, according to particular embodiments, the same characteristics as those which were described above in relation to the binder mixes and premixes according to the invention.

The W/B ratio, where W denotes the amount of water and B the amount of binder (all the assembled materials (Portland cement+ultrafine and fine particle size categories)), is typically from 0.1 to 0.5 and preferably from 0.13 to 0.30. In contrast, the W/C ratio, where W denotes the amount of water and C the amount of cement, is greater than in the case of the conventional high or ultra-high performance concrete, this being due to the small amount of cement which is present. The W/C ratio is preferably from 0.2 to 2, preferably from 0.5 to 1.

The W/C and W/B ratios are in particular adjusted according to the amount of cement and the desired final mechanical properties. For a lower amount of cement, the ratio will also be relatively lower. A person skilled in the art, by routine tests, can determine the amount of water as a function of the amount of cement, fines and ultrafines of the composition, according to measurements of compressive strength of the samples.

According to an advantageous embodiment of the process for the preparation of a concrete composition according to the invention, the amount of water used is from 150 to 300 l/m$^3$, preferably from 180 to 250 l/m$^3$.

The concrete can be reinforced, for example with metal reinforcements.

The concrete can be pre-tensioned, by bonded cables or tendons, or post-tensioned, by unbonded cables or tendons or sleeves or bars.

The pre-stressing, in the form of pre-tensioning or post-tensioning, is particularly suited to the products manufactured according to the present invention.

According to an embodiment, the concrete compositions formulated according to the invention are the result of a complex optimization of the various parameters entering into play (choice of materials and concentrations thereof) in order to guarantee optimized packing (choice of the particle size and choice of the admixturization), optimized chemistry of the hydration (numerous components do participate in the reaction: for example, limestone powder or fly ash) and an optimized water demand.

The concrete compositions obtained according to the invention have a compressive strength greater than or equal to 50 MPa 48 hours after mixing and/or greater than or equal to 100 MPa 28 days after mixing, and/or greater than or equal to 120 MPa after mixing and after a heat treatment, for example 2 days at 20° C. after setting and then 2 days at 90° C.

The various aims and advantages of the invention are obtained by virtue of an exhaustive optimization of all the formulation parameters and in particular by virtue of:

the development of a binder mix having a compartmentalization of the materials into substantially disconnected particle size categories, in particular into a fine category, a medium category, a higher category and an ultrafine category, which makes optimization of the packing of the various particles possible;

the presence, in addition to the cement, of non-cementitious binder materials belonging to the fine particle size category, which can be predominant with respect to the cement and the choice and the proportions of which are optimized;

the use of ultrafines and in particular of elements having a pozzolanic reaction, capable of participating in the hydraulic bonding function;

the adjustment of the water demand; and
the optimization of the various admixtures.

Preferably, the concretes according to the invention are fluid or self-placing (self-compacting or self-leveling) concretes.

The concrete according to the invention can be prepared according to processes known to a person skilled in the art, comprising the mixing of the solid components and water, the shaping (for example, moulding, pouring, injection, pumping, extrusion or calendering) and the hardening.

The invention further relates to an element made of hardened concrete, comprising:

from 10 to 200 kg/m$^3$, preferably from 20 to 100 kg/cm$^3$, of the material of the ultrafine particle size category as defined above;
selected Portland cement hydrates in an amount corresponding to an amount of Portland cement of from 130 to 350 kg/m$^3$, preferably from 150 to 300 kg/m$^3$;
from 200 to 600 kg/m$^3$, preferably from 300 to 500 kg/m$^3$, of the material of the fine particle size category as defined above;
from 500 to 800 kg/m$^3$, preferably from 500 to 700 kg/m$^3$, of the material of the medium particle size category as defined above; and
from 500 to 1300 kg/m$^3$, preferably from 800 to 1100 kg/m$^3$, of the material of the higher particle size category as defined above.

The invention further relates to a process for the preparation of a concrete composition comprising a stage of mixing a mix according to the invention with water.

Furthermore, the invention relates to a process for the preparation of a concrete composition comprising a stage of mixing a binder premix according to the invention with the material of medium particle size category as defined above, the material of higher particle size category as defined above and water.

Furthermore, the invention relates to a process for the preparation of a concrete composition comprising a stage of mixing:

- from 10 to 200 kg/m$^3$, preferably from 20 to 100 kg/m$^3$, of the material of the ultrafine particle size category as defined above;
- from 130 to 350 kg/m$^3$, preferably from 150 to 300 kg/m$^3$, of selected Portland cement;
- from 200 to 600 kg/m$^3$, preferably from 300 to 500 kg/m$^3$, of the material of the fine particle size category as defined above;
- from 500 to 800 kg/m$^3$, preferably from 500 to 700 kg/m$^3$, of the material of the medium particle size category as defined above; and
- optionally a plasticizer and/or an accelerator and/or an air-entraining agent and/or a thickening agent and/or a retarder; with
- water.

According to an advantageous embodiment of the process for the preparation of a concrete composition according to the invention, the amount of water used is from 150 to 300 l/m$^3$, preferably from 180 to 250 l/m$^3$.

The concrete can be subjected to a heat treatment after the setting in order to improve its mechanical properties. The post-setting treatment, also known as the curing of the concrete, is generally carried out at a temperature from ambient temperature (for example, from 20° C. to 90° C.), preferably from 60° C. to 90° C. The temperature of the treatment has to be less than the boiling point of water at the ambient pressure. The temperature of the post-setting heat treatment is generally less than 100° C. Higher curing temperatures can be used by placing the concrete in an autoclave in which the heat treatment is carried out at high pressures.

The duration of the post-setting heat treatment can, for example, be from 6 hours to 4 days, preferably approximately 2 days. The heat treatment is begun after the setting, generally at least one day after the setting has begun and preferably on concrete aged from 1 to 7 days at 20° C.

The heat treatment can be carried out in dry or wet environments or according to cycles which alternate the two environments, for example a treatment in a wet environment for 24 hours followed by a treatment in a dry environment for 24 hours.

Figure 1:
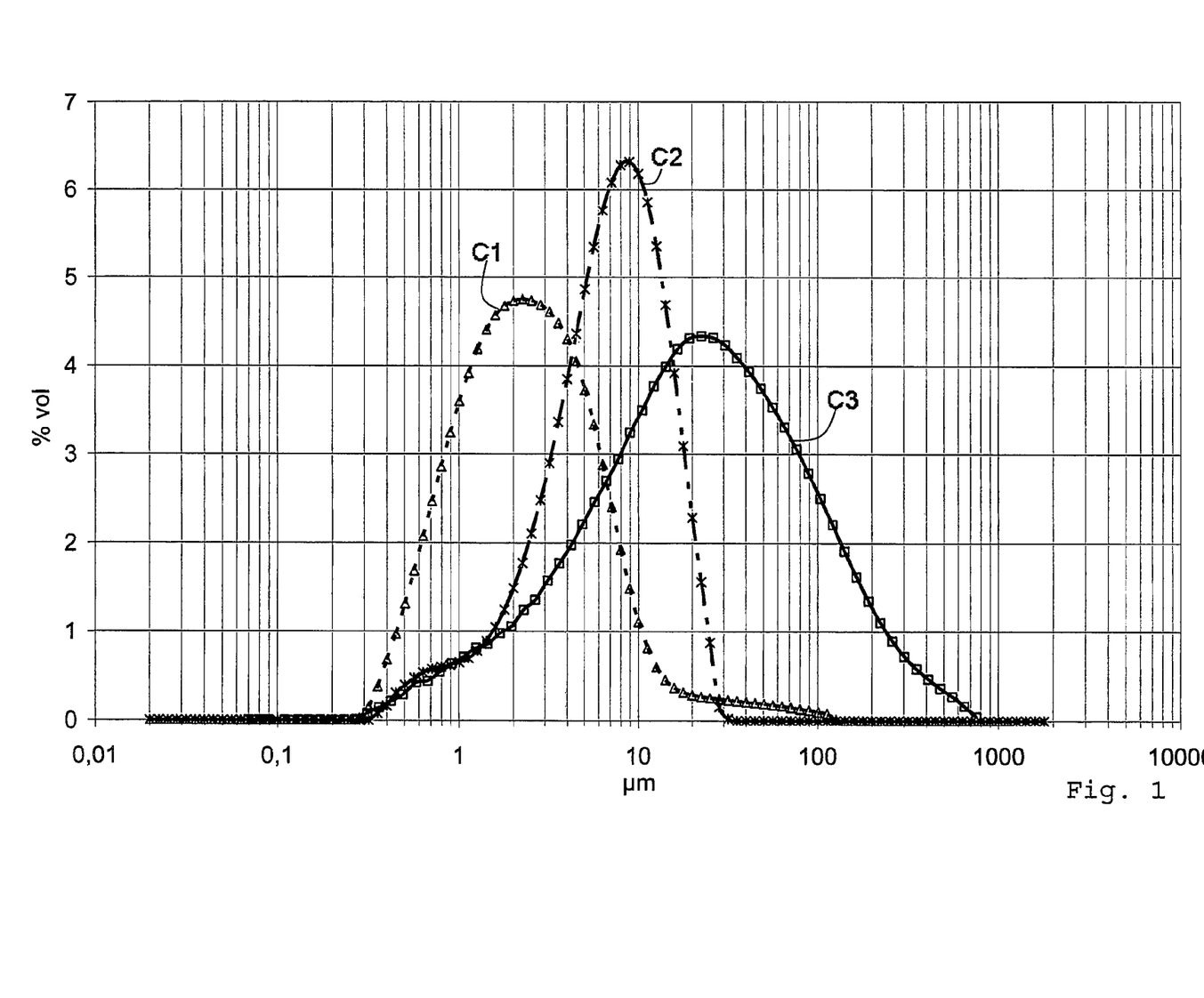
FIG. 1 represents the particle size distribution profiles of various materials used to prepare an example of an embodiment of a dry binder mix according to the invention as well as the associated mixed concrete. The size in µm appears on the x axis and the percentage by volume appears on the y axis.
Figure 2:
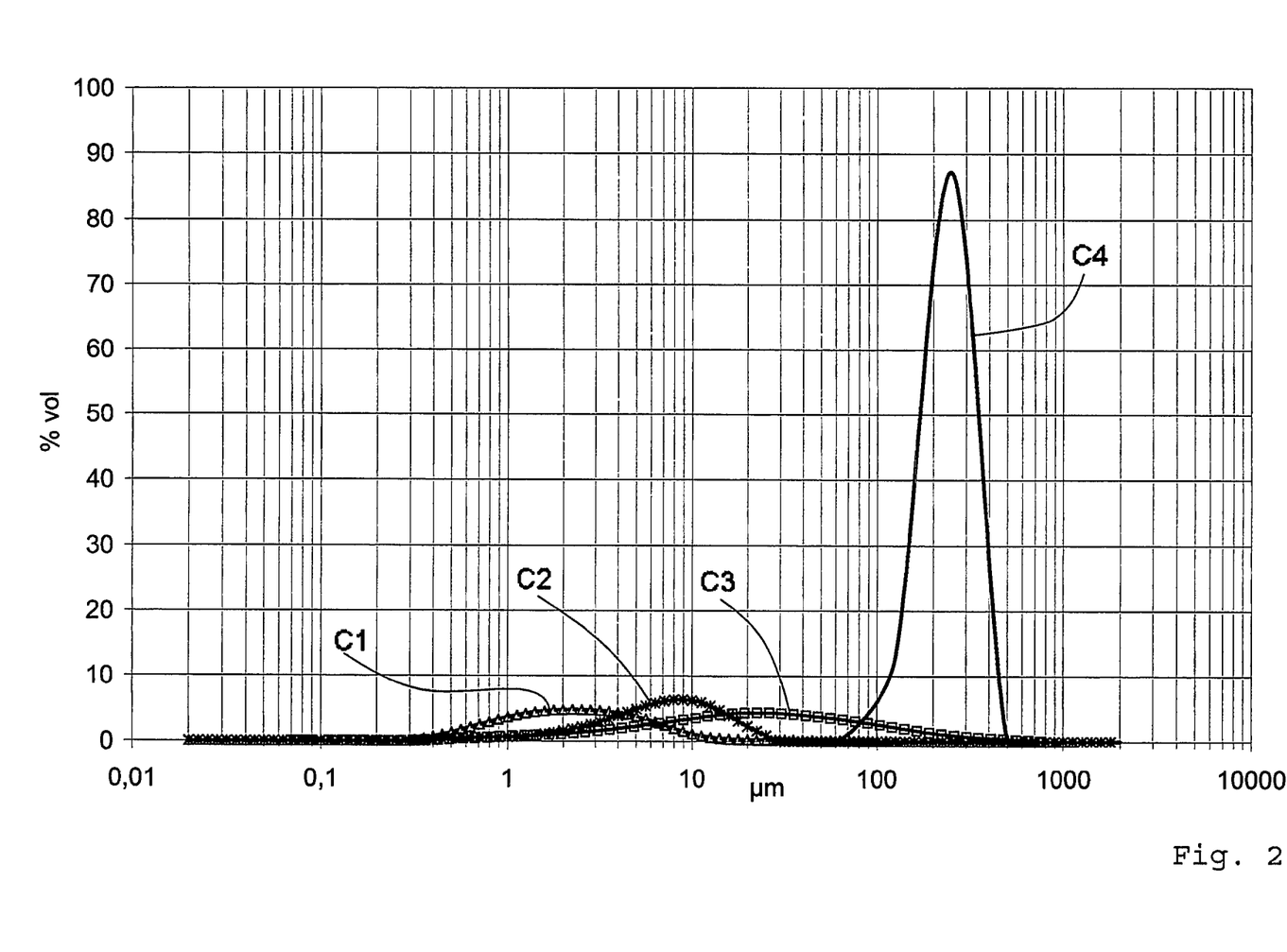
FIG. 2 represents the particle size distribution profiles of various materials used to prepare an example of an embodiment of a dry binder mix according to the invention as well as the associated mixed concrete. The size in µm appears on the x axis and the percentage by volume appears on the y axis.

The particle size distribution profiles of various materials used to prepare an example of an embodiment of a dry binder mix according to the invention as well as the associated mixed concrete are represented in FIGS. 1 and 2. The size in μm appears on the x axis and the percentage by volume appears on the y axis.

The following measurement methods were used:

Laser Particle Sizing Method

The particle size curves of the various powders are obtained using a Malvern MS2000 laser particle sizer. The measurement is carried out in an appropriate medium (for example in an aqueous medium); the size of the particles must be from 0.02 μm to 2 mm. The light source is provided by a red He—Ne laser (632 nm) and a blue diode (466 nm). The optical model is that of Fraunhofer and the calculation matrix is of the polydisperse type.

A background noise measurement is first carried out with a pump speed of 2000 rev/min, a stirrer speed of 800 rev/min and a noise measurement noise for 10 seconds, in the absence of ultrasound. The light intensity of the laser is verified to be at least equal to 80% and that a decreasing exponential curve for the background noise is obtained. If this is not the case, the lenses of the cell must be cleaned.

A first measurement is then carried out on the sample with the following parameters: pump speed of 2000 rev/min, stirrer speed of 800 rev/min, absence of ultrasound, obscuration limit between 10% and 20%. The sample is introduced in order to have an obscuration slightly greater than 10%. After stabilization of the obscuration, the measurement is carried out with a fixed time between immersion and measurement set at 10 seconds. The duration of the measurement is 30 seconds (30000 diffraction images analyzed). In the obtained particle size distribution curve the fact that a portion of the population of the powder may be agglomerated should take into account.

Then a second measurement is carried out (without emptying the cell) with ultrasound. The pump speed is brought to 2500 rev/min, stirring is brought to 1000 rev/min and the ultrasound is emitted at 100% (30 watts). These conditions are maintained for 3 minutes and then the initial parameters are restored: pump speed of 2000 rev/min, stirrer speed of 800 rev/min and absence of ultrasound. After 10 s (in order to remove any possible air bubbles), a measurement is carried out for 30 s (30000 images analyzed). This second measurement corresponds to a powder deagglomerated by ultrasonic dispersion.

Each measurement is repeated at least twice in order to verify the stability of the result. The apparatus is calibrated before each work session by means of a standard sample (Sifraco C10 silica) for which a particle size curve is known. All the measurements given in the description and the indicated ranges correspond to the values obtained with ultrasound.

Method for Measurement of the BET Specific Surface

The specific surface of the different powders is measured as follows. A sample of powder with the following mass is withdrawn: 0.1 to 0.2 g for a specific surface estimated at more than 30 m$^2$/g; 0.3 g for a specific surface estimated at 10-30 m$^2$/g; 1 g for a specific surface estimated at 3-10 m$^2$/g; 1.5 g for a specific surface estimated at 2-3 m$^2$/g; 2 g for a specific surface estimated at 1.5-2 m$^2$/g; and 3 g for a specific surface estimated at 1-1.5 m$^2$/g.

A 3 cm$^3$ or 9 cm$^3$ cell is used, depending on the volume of the sample. The measurement cell assembly (cell+glass rod) is weighed. The sample is then added to the cell: the product must not be less than one millimeter from the top of the neck of the cell. The assembly (cell+glass rod+sample) is weighed. The measurement cell is placed on a degassing station and the sample is degassed. The degassing parameters are 30 minutes/45° C. for Portland cement, gypsum or pozzolanas; 3 hours/200° C. for slags, fly ash, aluminous cement, limestone; and 4 hours/300° C. for the control alumina. The cell is rapidly stoppered with a stopper after the degassing. The assembly is weighed and the result is noted. All the weightings are carried out without the stopper, the latter being temporarily removed in order to carry out the measurement. The mass of the sample is obtained by subtracting the mass of the cell from the sum of the masses of the cell and of the degassed sample.

The analysis of the sample is then carried out after having placed it on the measurement station. The analyzer is the SA 3100 from Beckman Coulter. The measurement is based on the adsorption of nitrogen by the sample at a given temperature, in this case the temperature of liquid nitrogen, i.e. approximately −196° C. The apparatus measures the pressure of the reference cell in which the adsorbate is at its saturated vapour pressure and that of the cell of the sample into which known volumes of adsorbate are injected. The resulting curve of these measurements is the adsorption isotherm. In the measurement process, it is necessary to know the dead space of the cell: this space is thus measured with helium before the analysis.

The mass of the sample calculated beforehand is entered as a parameter. The BET specific surface is determined by the software by linear regression from the experimental curve. The reproducibility standard deviation obtained from 10 measurements on a silica with a specific surface of 21.4 m²/g is 0.07. The reproducibility standard deviation obtained from 10 measurements on a cement with a specific surface of 0.9 m²/g is 0.02. A control is carried out on a reference product once every two weeks. A control is carried out twice a year with reference alumina provided by the manufacturer.

Method for Measurement of the Compressive Strength

Whatever the time period, the compressive strength is measured on a cylindrical sample having a diameter of 7 cm and a height of 14 cm; the force applied to the sample is increased at a rate of 3.85 kN/sec during the compression test.

Method for Measurement of the Spread

The spread (dynamic, with impacts—normally 20—at intervals of approximately 1 second, or static, without impacts) is measured on a circular impact table (diameter 300 mm, thickness 5.9 mm, mass of approximately 4.1 kg) with a fall of approximately 12 mm. Test samples (500 ml) are prepared using a truncated mould having a height of 50 mm, an upper diameter of 70 mm, a lower diameter of 100 mm. The static spread (without impacts) is measured after the sample has ceased to flow after demoulding.

EXAMPLES

The present invention is described by the following non-limiting examples. In these examples, the materials used are available from the following suppliers:

| | |
|---|---|
| Durcal 1 | Omya, France |
| Superplasticizer F2 | Chryso, France |
| HSC Cement, Le Teil | Lafarge, France |
| Be01 Sand | Sifraco, France |
| Fly ash from Carling, Band 6 | Surchiste, France |

Durcal 1 corresponds to the material of the ultrafine particle size category. It has a D10 value of 0.8 μm, a D90 value of 8 μm and a BET specific surface of approximately 5.61 m²/g. The fly ash from Carling, Band 6, corresponds to the material of fine particle size category. It has a D10 value of 2.7 μm and a D90 value of 116 μm. The selected Portland cement (HSC cement, Le Teil) has a D10 value of 2.1 μm and a D90 value of 16.6 μm. The Be01 sand corresponds to the material of medium particle size category. The Be01 sand has a D90 value of approximately 300 μm and a D10 value of approximately 200 μm.

A cement was prepared by pneumatic classification using an Alpine 50 ATP separator. The principle consists in separating an initial population into 2 fractions (even 3 fractions, if the ultrafines are considered separately): a fraction formed of the coarsest particles of the initial material, referred to as the oversize, and a fraction formed of the finest particles of the initial material. The rotational speed of the selector and the air flow rates were adjusted so as to obtain separation of the particles at 20 μm.

The particle size distribution profiles of the cement and materials of the ultrafine and fine particle size categories used to prepare the present exemplary embodiment of a dry binder mix according to the invention are represented in FIG. 1. The particle size distribution profiles of the cement and of the materials of the ultrafine, fine and medium particle size categories used to prepare the present example of an embodiment of a dry binder mix are represented in FIG. 2. In these figures, curve C1 corresponds to the particle size distribution profile of Durcal 1, curve C2 corresponds to the particle size distribution profile of the cement, curve C3 corresponds to the particle size distribution profile of the fly ash and curve C4 corresponds to the particle size distribution profile of the Be01 sand.

The particle size distribution profile of the materials used (as determined by laser particle sizing for the particles with an average size less than 63 μm and by sieving for the particles with a average size greater than 63 μm) is represented in FIG. 1 and highlights the compartmentalization of the materials into disconnected particle size categories.

Example 1

An example of an embodiment of fresh concrete according to the present invention was carried out according to the following formulation:

| | Relative composition by mass |
|---|---|
| Cement selected (HSC) | 1.00 |
| Filler (Durcal 1) | 0.86 |
| Fly ash | 2.48 |
| Sand (Be01) | 3.91 |
| Superplasticizer (F2) | 0.097 |
| W/B | 0.158 |

The mix was produced in a mixer of the Rayneri type. When a heat treatment is provided, the latter consists of waiting for 24 hours at 20° C. after setting and then maintaining the concrete at 90° C. for 48 hours.

The concrete composition after setting has the following properties:

| | |
|---|---|
| Spread without impacts at 13 minutes (mm) | 275 |
| Compression at 48 hours (MPa) | 76.7 |
| Compression at 28 days without heat treatment (MPa) | 116 |
| Compression after heat treatment (MPa) | 147 |

The invention claimed is:

1. A binder mix, comprising in mass proportions:
   from 10% to 25% of a material of an ultrafine particle size category, the individual particles of which have a D90 value less than 1 μm and/or a BET specific surface greater than 5 m²/g, wherein the material of the ultrafine particle size category comprises from 0 to less than 1%, by weight of a total mass of the material of the ultrafine particle size category, of silica fume;
   from 8% to 25% of selected Portland cement;
   from 25% to 40% of a material, other than the cement, of a fine particle size category, the particles of which have a D10 and D90 value from 1 μm to 120 μm and a BET specific surface less than 5 m²/g, and
   from 20% to 60% of a material of a medium particle size category, the particles of which have a D10 and D90 value from 120 μm to 5 mm.

2. The binder mix according to claim 1, comprising in mass proportions:
   from 10% to 20% of the material of the ultrafine particle size category;
   from 10% to 20% of the selected Portland cement;

from 25% to 33% of the material of the fine particle size category; and from 35% to 55% of the material of the medium particle size category.

3. The binder mixing according to claim 1, wherein the material of ultrafine particle size category does not comprise silica fume.

4. The binder mix according to claim 1, further comprising a material of a higher particle size category, the particles of which have a D10 value greater than 5 mm.

5. The binder mix according to claim 4, comprising in mass proportions:

from 10% to 20% of the material of the ultrafine particle size category;

from 8% to 20% of the selected Portland cement;

from 25% to 32% of the material of the fine particle size category;

from 25% to 48% of the material of the medium particle size category, and from 20% to 60% of the material of the higher particle size category.

6. The binder mix according to claim 1, further comprising a plasticizer, the proportion of the plasticizer being from 0.05% to 3%, expressed as a mass ratio of dry extract of the plasticizer to the total mass of the materials of the ultrafine particle size category, the Portland cement and the material of the fine particle size category.

7. The binder mix according to claim 1, wherein the selected Portland cement is a Portland cement on which a preparation is carried out in order to retain particles of a given particle size category by sieving or by pneumatic selection.

8. The binder mix according to claim 1, comprising in mass proportions:

from 10% to 20% of the material of the ultrafine particle size category.

9. A concrete composition, comprising a binder mix according to claim 1 and water.

10. The concrete composition according to claim 9, having, after hardening, a compressive strength greater than or equal to 100 MPa 28 days after mixing, and/or greater than or equal to 120 MPa 28 days after mixing after a heat treatment.

11. The concrete composition according to claim 9, wherein a W/C ratio, where W denotes the amount of water and C the amount of cement, is greater than or equal to 0.5 and lower than 1.

12. The binder mix according to claim 1, wherein the material of the ultrafine particle size category is selected from the group consisting of limestone powder, precipitated carbonate, natural and artificial pozzolans, pumice, ground fly ash, ground material from carbonated or hydrated silicic hydraulic binder, and mixes or cogrindings thereof.

13. The binder mix according to claim 1, wherein the material of the fine particle size category is selected from the group consisting of fly ash, pozzolan, limestone powder, siliceous powder, lime, calcium sulfate and slag.

14. The binder mix according to claim 1, wherein the material of the medium particle size category is selected from the group consisting of sand and fine sand.

15. The binder mix according to claim 4, wherein the material of the higher particle size category is selected from the group consisting of fine gravel, gravel, pebble and mixes thereof.

* * * * *